(12) United States Patent
Nakamura et al.

(10) Patent No.: US 9,954,408 B2
(45) Date of Patent: Apr. 24, 2018

(54) MOTOR STATOR WITH IMPROVED CONNECTION MEMBER

(71) Applicant: Mitsubishi Electric Corporation, Tokyo (JP)

(72) Inventors: Masashi Nakamura, Tokyo (JP); Shogo Okamoto, Tokyo (JP); Tomohiro Bessho, Tokyo (JP); Katsuhiko Sakamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 14/650,930

(22) PCT Filed: Apr. 10, 2013

(86) PCT No.: PCT/JP2013/060827
§ 371 (c)(1),
(2) Date: Jun. 10, 2015

(87) PCT Pub. No.: WO2014/167668
PCT Pub. Date: Oct. 16, 2014

(65) Prior Publication Data
US 2015/0311764 A1    Oct. 29, 2015

(51) Int. Cl.
*H02K 11/00* (2016.01)
*H02K 3/00* (2006.01)
(Continued)

(52) U.S. Cl.
CPC ......... *H02K 3/522* (2013.01); *H02K 2203/09* (2013.01)

(58) Field of Classification Search
CPC .................. H02K 3/50; H02K 15/00
(Continued)

(56) References Cited

U.S. PATENT DOCUMENTS

| 5,900,687 A | 5/1999 | Kondo et al. |
| 2003/0094879 A1 | 5/2003 | Kobayashi et al. |

(Continued)

FOREIGN PATENT DOCUMENTS

| CN | 102570678 A | 7/2012 |
| JP | 10-248187 A | 9/1998 |

(Continued)

OTHER PUBLICATIONS

Communication dated Mar. 15, 2016, from the Japanese Patent Office in counterpart application No. 2015-511012.
(Continued)

*Primary Examiner* — Jose Gonzalez Quinones
(74) *Attorney, Agent, or Firm* — Sughrue Mion, PLLC; Richard C. Turner

(57) ABSTRACT

A connection member for supplying a stator winding with a current is constituted by covering a bus bar with a insulating resin. The bus bar is formed in an arc-like shape in the thickness direction of a belt-shaped conductor. Additionally, a weld zone formed on the bus bar has a projection portion projecting in the width direction, a first bent portion bent outside the arc from the projection portion in the thickness direction, and a second bent portion with the tip end thereof folded back in the width direction to allow the tip end of the second bent portion to be welded to a terminal on the stator winding.

6 Claims, 3 Drawing Sheets

(51) Int. Cl.
*H02K 3/04* (2006.01)
*H02K 3/52* (2006.01)

(58) Field of Classification Search
USPC .......... 310/71, 180, 144, 179, 184, 194, 208
See application file for complete search history.

(56) References Cited

U.S. PATENT DOCUMENTS

| | | | |
|---|---|---|---|
| 2003/0201688 A1* | 10/2003 | Yamamura | H02K 3/50 310/71 |
| 2005/0253466 A1 | 11/2005 | Seguchi et al. | |
| 2009/0140595 A1* | 6/2009 | Naganawa | H02K 3/522 310/201 |
| 2010/0201213 A1* | 8/2010 | Kataoka | H02K 11/21 310/71 |
| 2012/0037436 A1* | 2/2012 | Kwon | H02K 3/50 180/65.1 |
| 2012/0126646 A1* | 5/2012 | Nakagawa | H02K 3/522 310/71 |
| 2012/0286593 A1 | 11/2012 | Yokogawa et al. | |
| 2012/0293024 A1 | 11/2012 | Yokogawa et al. | |

FOREIGN PATENT DOCUMENTS

| | | |
|---|---|---|
| JP | 2003-134728 A | 5/2003 |
| JP | 2005328661 A | 11/2005 |
| JP | 2009290921 A | 12/2009 |
| JP | 2011-205876 A | 10/2011 |
| JP | 2011-205877 A | 10/2011 |
| WO | 2012/070752 A1 | 5/2012 |

OTHER PUBLICATIONS

Communication dated Aug. 18, 2015 from the Japanese Patent Office in counterpart application No. 2015-511012.
International Search Report for PCT/JP2013/060827 dated Jul. 2, 2013.
Communication dated Mar. 23, 2017, from the State Intellectual Property Office of People's Republic of China in counterpart Application No. 201380075502.4.

\* cited by examiner

MOTOR STATOR WITH IMPROVED CONNECTION MEMBER

CROSS REFERENCE TO RELATED APPLICATIONS

This application is a National Stage of International Application No. PCT/JP2013/060827 filed Apr. 10, 2013, the contents of all of which are incorporated herein by reference in their entirety.

TECHNICAL FIELD

The present invention relates to a motor stator, and more particularly, to a motor stator having a connection member connected to a stator winding of a vehicle motor to supply the stator winding with a current.

BACKGROUND ART

In general, a problem arising when forming a connection member equipped to a motor stator to supply a stator winding of the motor with a current is vibrations applied to the motor stator. Particularly, in the case of a vehicle motor, strong vibrations are applied to the motor stator from the outside and high vibration resistance is required for the connection member connected to a stator winding wound around the motor stator to supply a current. It is therefore necessary to improve rigidity of the connection member.

In addition, another problem arises from insulation. It is also necessary to take a countermeasure against this insulation problem because metal foreign matter or the like mixed during fabrication or entering into the motor while the motor is in use often causes a short circuit between bus bars forming the connection member.

A method employed to solve these problems is, as is disclosed, for example, in JP-A-2003-134728 (PTL 1), to form the connection member in one piece by insert molding and to insulate and fix the connection member with a resin material.

CITATION LIST

Patent Literature

PTL 1: JP-A-2003-134728

SUMMARY OF INVENTION

Technical Problem

Meanwhile, a motor capacity is increasing in recent years and so is an output density. Hence, a connection member for a higher current with higher heat-resistance is now required. The bus bars forming the connection member, however, increase in size by merely forming the connection member into one piece by insert molding and insulating and fixing the connection member with a resin material as in the related art above, and larger bus bars raise a problem that a size of the motor is increased. In order to solve this problem, a need for a smaller and thinner connection member is increasing. It is therefore necessary to reduce a size of the connection member including a portion connected to a stator winding of the motor.

The invention was devised to solve the problems above and provides a motor stator having a connection member achieving higher output and density and reduced in size including a portion connected to a stator winding while maintaining high reliability.

Solution to Problem

A motor stator according to one aspect of the invention is a motor stator including: a stator core formed by laminating thin plates and having a plurality of salient poles projecting in a radial direction; a stator winding wound around each salient pole of the stator core; and a connection member connected to the stator winding to supply the stator winding with a current. The motor stator is characterized in that: the connection member is formed by covering one or more than one bus bar with an insulating resin, each bus bar being a belt-shaped conductor formed in an arc-like shape in a thickness direction of the belt-shaped conductor and covered with the insulating resin at least in a portion opposing a coil end of the stator winding; a weld zone is formed on the bus bar; and the weld zone has a projection portion projecting in a width direction, a first bent portion bent outside the arc from the projection portion in a thickness direction, and a second bent portion with a tip end thereof folded back in the width direction to allow the tip end of the second bent portion to be welded to a terminal on the stator winding.

Advantageous Effects of Invention

According to the motor stator configured as above, the connection member connected to the stator winding to supply the stator winding with a current is formed by covering one or more than one bus bar with an insulating resin. Herein, each bus bar is a belt-shaped conductor formed in an arc-like shape in the thickness direction of the belt-shaped conductor and covered with the insulating resin at least in a portion opposing the coil end of the stator winding. Also, the bus bar is provided with the weld zone and the weld zone has the projection portion projecting in the width direction, the first bent portion bent outside the arc from the projection portion in the thickness direction, and the second bent portion with the tip end thereof folded back in the width direction to allow the tip end of the second bent portion to be welded to the terminal on the stator winding. Owing to this configuration, it becomes possible to obtain a motor stator having a connection member achieving higher output and density and reduced in size including a portion connected to the stator winding while maintaining high reliability.

The above and other objects, features, viewpoints, and advantages of the present invention will become more apparent from the following detailed description taken in conjunction with the accompanying drawings.

DESCRIPTION OF EMBODIMENT

Hereinafter, a preferred embodiment of a motor stator of the invention will be described with reference to the drawings.

First Embodiment

Figure 1:
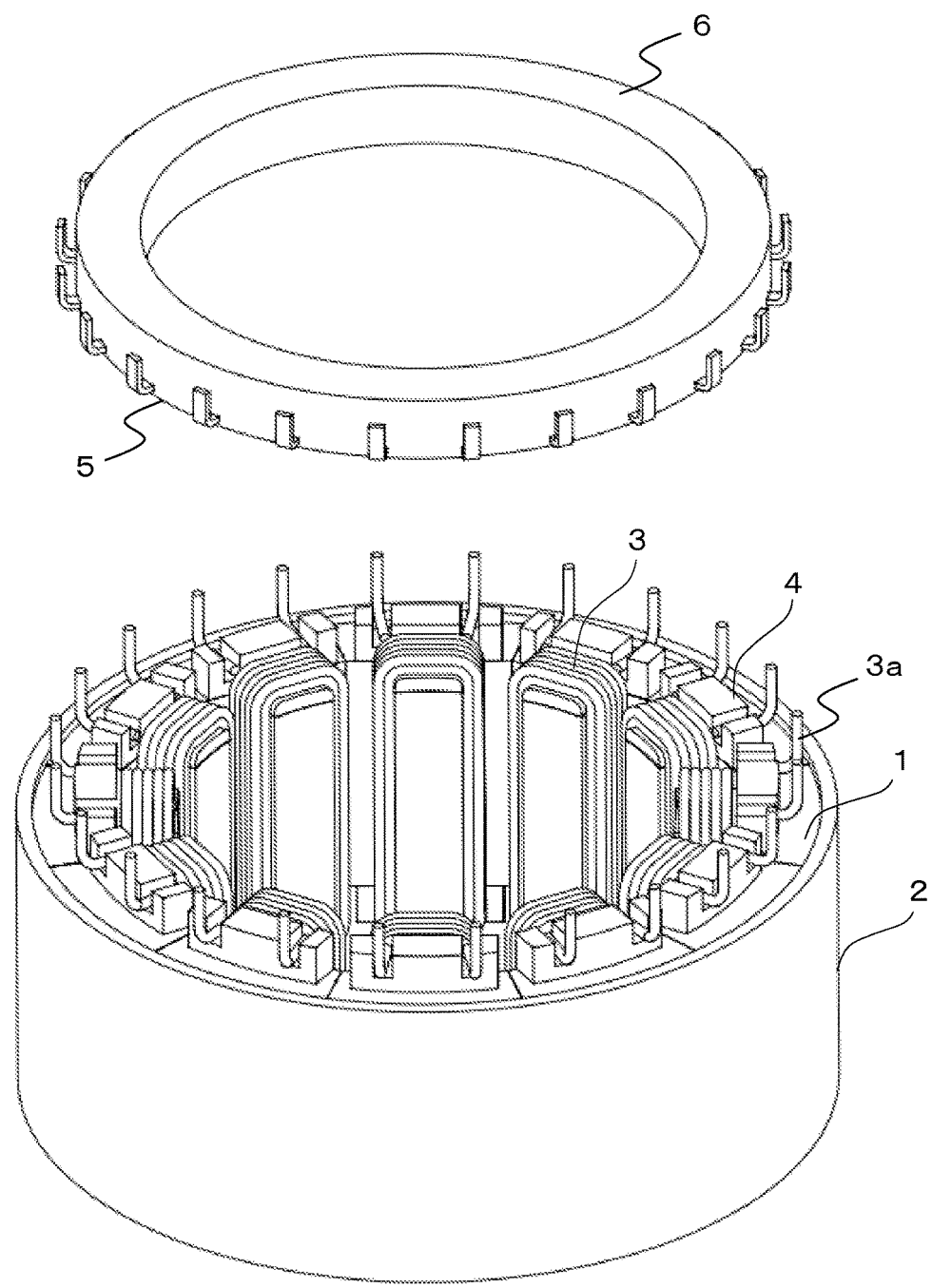
FIG. 1 is an exploded perspective view of a motor stator according to a first embodiment of the invention.

FIG. 1 is an exploded perspective view of a motor stator according to a first embodiment of the invention. Referring to FIG. 1, a motor stator 10 includes a split stator core (hereinafter, referred to as the stator core) 1 formed by laminating a large number of thin plates, such as silicon steel plates, punched out by a press and having a plurality of salient poles projecting in a radial direction, a frame 2 holding the stator core 1 split into a plurality of segments, for example, by shrink fitting, a stator winding 3 wound around each salient pole of the stator core 1 via enamel coating for insulation, an insulator 4 insulating the stator winding 3 from the stator core 1, and a connection member 5 connected to a terminal 3a on the stator winding 3 to supply the stator winding 3 with three-phase power. As will be described below, the connection member 5 is formed of more than one bus bar and the bus bars are integrally covered with a insulating resin 6.

Figure 2:
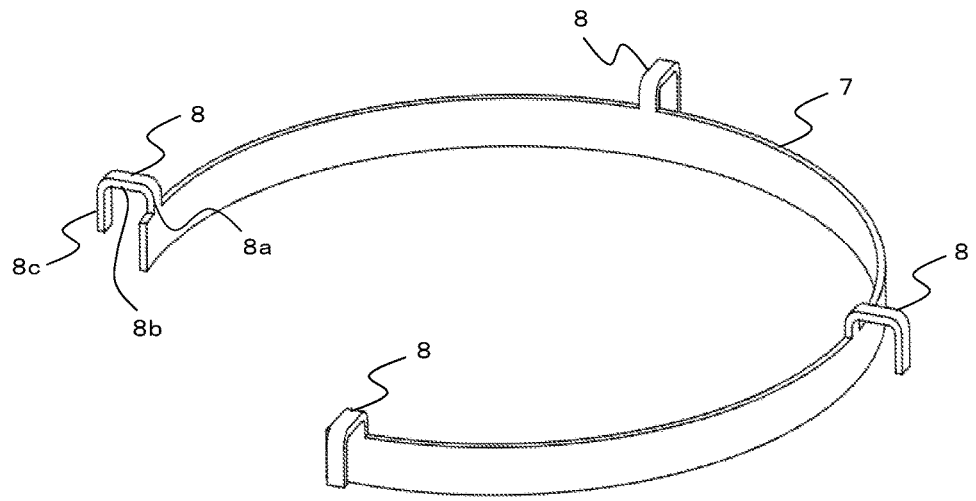
FIG. 2 is a perspective view of a bus bar forming a connection member of the motor stator according to the first embodiment of the invention.

FIG. 2 is a perspective view of the bus bar forming the connection member 5. The bus bar 7 is formed of a belt-shaped conductor processed by punch molding and this belt-shaped conductor is rounded in a thickness direction to form an arc-like shape. The bus bar 7 includes more than one weld zone 8 (four in FIG. 2) joined to the corresponding stator winding 3 by TIG (Tungsten Inert Gas) welding. The weld zone 8 is of a shape having a projection portion 8a projecting in a width direction of the bus bar 7, a first bent portion 8b bent outside the arc from the projection portion 8a in the thickness direction, and a second bent portion 8c with a tip end thereof folded back in the width direction, that is, a box shape having the bottom portion in FIG. 2 as a top surface.

The connection member 5 is formed as follows. That is, a total of four bus bars 7 formed as above, for example, three bus bars 7 for phases to supply the stator winding 3 with three-phase power and one bus bar 7 for neutral point to connect a neutral point, are prepared. The four bus bars 7 are superimposed at regular intervals in the thickness direction of the bus bars 7 in an arc-like shape as is shown in the assembly diagram of FIG. 3. It should be noted that the weld zones 8 on each bus bar 7 are formed at positions at which the weld zones 8 oppose the terminals 3a on the corresponding stator windings 3. Also, the first bent portion 8b of the weld zone 8 on each bus bar 7 is formed to have a length that varies depending on where the bus bar 7 is located so that the second bent portions 8c of the weld zones 8 formed on the respective bus bars 7 are positioned on the same arc. In this embodiment, four bus bars 7 in total, that is, three bus bars 7 for phases to supply the stator winding 3 with three-phase power and one bus bar 7 for neutral point to connect the neutral point, are prepared. It should be appreciated, however, that the number of the bus bars 7 varies with a circuit configuration of the stator winding 3.

Figure 3:
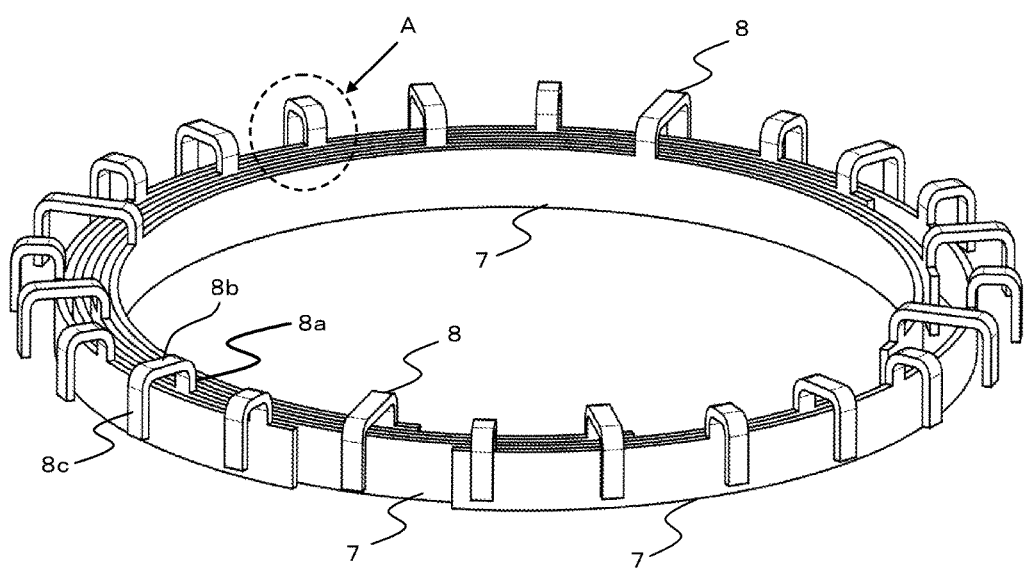
FIG. 3 is a perspective view of an assembly of bus bars forming the connection member of the motor stator according to the first embodiment of the invention.
Figure 4:
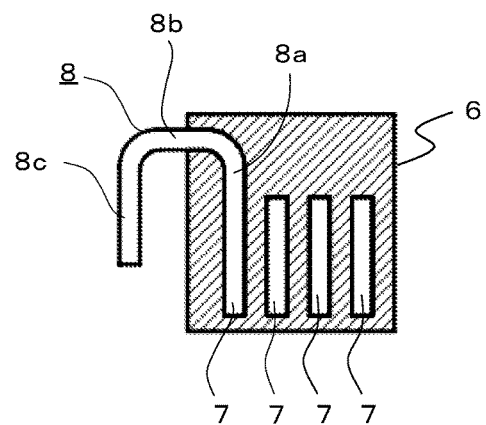
FIG. 4 is a cross section of the connection member of the motor stator according to the first embodiment of the invention.

A plurality of the bus bars 7 in an arc-like shape superimposed at regular intervals in the thickness direction as is shown in FIG. 3 are formed in one piece with the insulating resin 6 as is shown in FIG. 1 so as to insulate and fix the respective bus bars 7. More specifically, a plurality of the bus bars 7 superimposed at regular intervals in the thickness direction of the bus bars 7 in an arc-like shape as shown in FIG. 3 are fixed in an unillustrated injection forming die and formed into one piece by insert molding by filling the insulating resin 6 into the injection forming die. During this molding process, each bus bar 7 is covered with the insulating resin 6 except for at least the second bent portions 8c. In this embodiment, each bus bar 7 is covered with the insulating resin 6 entirely except for the second bent portions 8c and portions connecting the first bent portions 8b to the second bent portions 8c. FIG. 4 is a cross section of the connection member 5 in a portion A of FIG. 3 to show in which manner the bus bars 7 covered with the insulating resin 6 are arranged.

Figure 5:
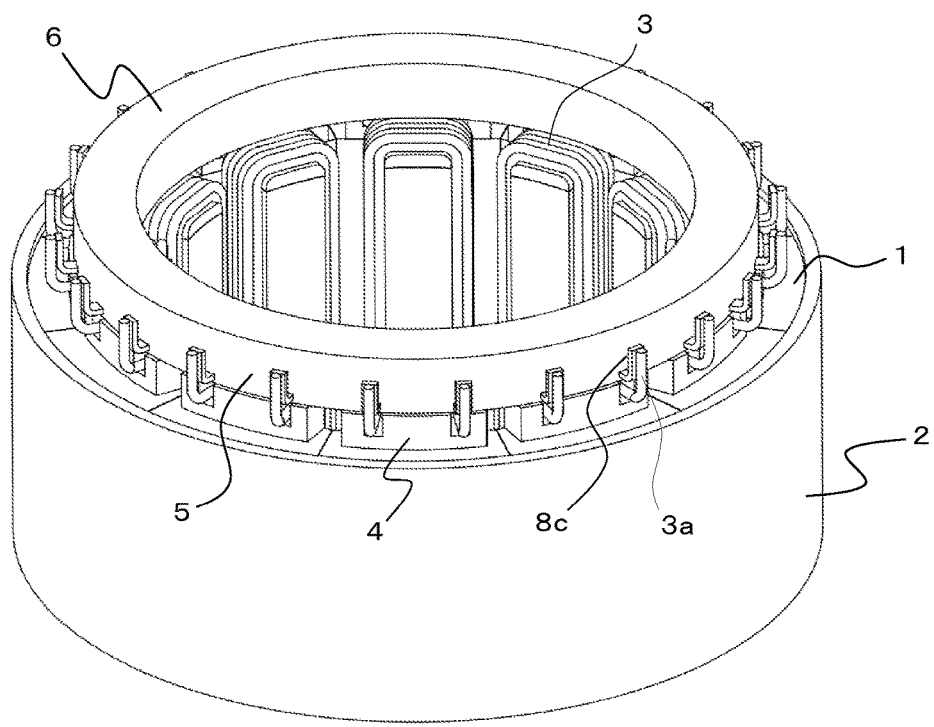
FIG. 5 is a perspective view of the motor stator according to the first embodiment of the invention.

A method of fitting the connection member 5 molded by the method above to the stator core 1 will now be described. FIG. 5 is a view showing a state where the connection member 5 is fit to the stator core 1. As can be understood from FIG. 5, the connection member 5 is fit to the stator core 1 by fitting the connection member 5 above the stator windings 3 in the direction in which the terminals 3a project to allow the second bent portions 8c of the weld zones 8 formed on the respective bus bars 7 to come into contact with the terminals 3a on the corresponding stator windings 3, that is, so as to form a shape like hands joined in prayer. As will be described below, the terminal 3a on the stator winding 3 and the tip end of the second bent portion 8c of the weld zone 8 formed on the bus bar 7 are joined by TIG welding. To this end, during this fitting process, the connection member 5 is fit to the stator core 1 so that the tip end of the weld zone 8 points upright. In this instance, a portion made of the insulating resin 6 in the connection member 5 and the insulator 4 are bonded with an adhesive to fix the connection member 5 to the insulator 4.

After the connection member 5 is fit to the stator core 1 as described above, the terminal 3a on the stator winding 3 and the tip end of the second bent portion 8c of the weld zone 8 formed on the bus bar 7 are joined by TIG welding. Herein, the terminal 3a on each stator winding 3 is bent to rise upright from the bottom of the connection member 5 so that the terminals 3a come next to the corresponding weld zones 8 on the respective bus bars 7. After the lengths are adjusted so that the terminal 3a on the stator winding 3 becomes flush with the tip end of the second bent portion 8c of the adjacent weld zone 8, the former and the latter are joined by TIG welding.

The welding method for the terminal 3a on the stator winding 3 and the tip end of the second bent portion 8c of the weld zone 8 formed on the bus bar 7 is not limited to TIG welding and other methods, such as electron beam welding, are also available. TIG welding, however, is advantageous because stable welding strength and quality can be obtained. Alternatively, when the connection member 5 is fit to the stator core 1, the connection member 5 may be provided on the upper side of the core back instead of on the upper side of a coil end portion of the stator winding 3. The same effect of shortening the axial length can be obtained in this case, too. In a case where the connection member 5 is provided on the upper side of the core back of the stator winding 3, it is effective to provide the weld zone 8 formed on the bus bar 7 by bending the first bent portion 8b inside the arc in the thickness direction of the bus bar 7.

As has been described above, advantages as follows can be obtained by the motor stator according to the first embodiment.

(1) The terminal 3a on the stator winding 3 and the tip end of the second bent portion 8c of the weld zone 8 formed on the bus bar 7 can be welded radially along the connection member 5. Also, the weld zone 8 is prevented from projecting from an end of the connection member 5 in the width direction by making the second bent portion 8c of the weld zone 8 shorter than the connection member 5 in the width direction. This configuration can shorten the motor stator 10, more specifically, an axial length of the motor and thereby contributes to achieving higher output and density.

(2) The weld zone 8 formed on the bus bar 7 is bent in the thickness direction and subsequently folded back in the width direction. This configuration requires only a mold be divided to upper and lower parts and does not interfere with a configuration of the insert mold.

(3) An insulation distance from one bus bar 7 to another can be secured by the insulating resin 6.

(4) Foreign matter is prevented from entering into the connection member 5. Hence, insulation reliability can be improved.

(5) The connection member 5 is formed by covering the bus bars 7 with the insulating resin 6 to form one piece. Owing to this configuration, a motor stator with high rigidity and a high resonance frequency, and hence with high reliability against vibrations can be obtained.

(6) The bus bar 7 is covered with the insulating resin 6 entirely except for the second bent portions 8c of the weld zones 8 and portions connecting the first bent portions 8b to the second bent portions 8c. This configuration enables insulation from the coil end of the stator winding 3. Also, this configuration prevents the bus bars 7 from falling off when the connection member 5 is fit to the stator core 1.

(7) Where the configuration of the mold is concerned, it is easy to cover the bus bar 7 with the insulating resin 6 entirely except for the second bent portions 8c of the weld zones 8 and bent portions connecting the first bent portions 8b to the second portion 8c. Accordingly, a covered portion can be extended as much as needed for insulation from the stator windings 3 to secure an insulation distance.

(8) When the connection member 5 is fit to the stator core 1, the connection member 5 is fit in one direction. Hence, a welder can be inserted in one direction when the terminal 3a on the stator winding 3 and the tip end of the weld zone 8 formed on the bus bar 7 are welded. This configuration makes equipment configuration easier and a subsequent operation, such as welding, can be performed more readily.

(9) Not only the terminal 3a on the stator winding 3 and the tip end of the second bent portion 8c of the weld zone 8 on the bus bar 7 are joined by TIG welding, but also the welding is performed while the weld portion is visible from directly above. Hence, quality of the weld portion can be controlled more readily by image inspection, which can in turn improve the productivity. Further, weld quality is stable because TIG welding is employed.

While the motor stator according to the first embodiment of the invention have been described, it should be appreciated that the embodiment can be modified or omitted as needed within the scope of the invention.

The invention claimed is:

1. A motor stator, comprising:
   a stator core formed by laminating thin plates and having a plurality of salient poles projecting in a radial direction;
   a stator winding wound around each salient pole of the stator core; and
   a connection member connected to the stator winding to supply the stator winding with a current,
   wherein:
   the connection member is formed by covering one or more than one bus bar with an insulating resin, each bus bar being a belt-shaped conductor formed in an arc-like shape in a thickness direction of the belt-shaped conductor and covered with the insulating resin at least in a portion opposing a coil end of the stator winding;
   a weld zone is formed on the bus bar;
   the weld zone has a projection portion projecting in a width direction of the bus bar, a first bent portion bent outside the arc from the projection portion in a thickness direction of the bus bar, and a second bent portion with a tip end thereof folded back in the width direction to allow the tip end of the second bent portion to be welded to a terminal on the stator winding; and
   the weld zone does not project beyond the insulating resin of the connection member in the width direction.

2. The motor stator according to claim 1, wherein:
   the bus bar is covered with the insulating resin except for at least the second bent portion.

3. The motor stator according to claim 2, wherein:
   the tip end of the second bent portion and the terminal on the stator winding are joined by TIG welding.

4. The motor stator according to claim 2, wherein:
   the second bent portion is shorter than the connection member in the width direction.

5. The motor stator according to claim 1, wherein:
   the tip end of the second bent portion and the terminal on the stator winding are joined by TIG welding.

6. The motor stator according to claim 1, wherein:
   the second bent portion is shorter than the connection member in the width direction.

* * * * *